March 9, 1971  F. R. DUFFIELD ET AL  3,568,495
CRIMP OR COMPRESSION DEVICE
Filed Feb. 12, 1969  3 Sheets-Sheet 1
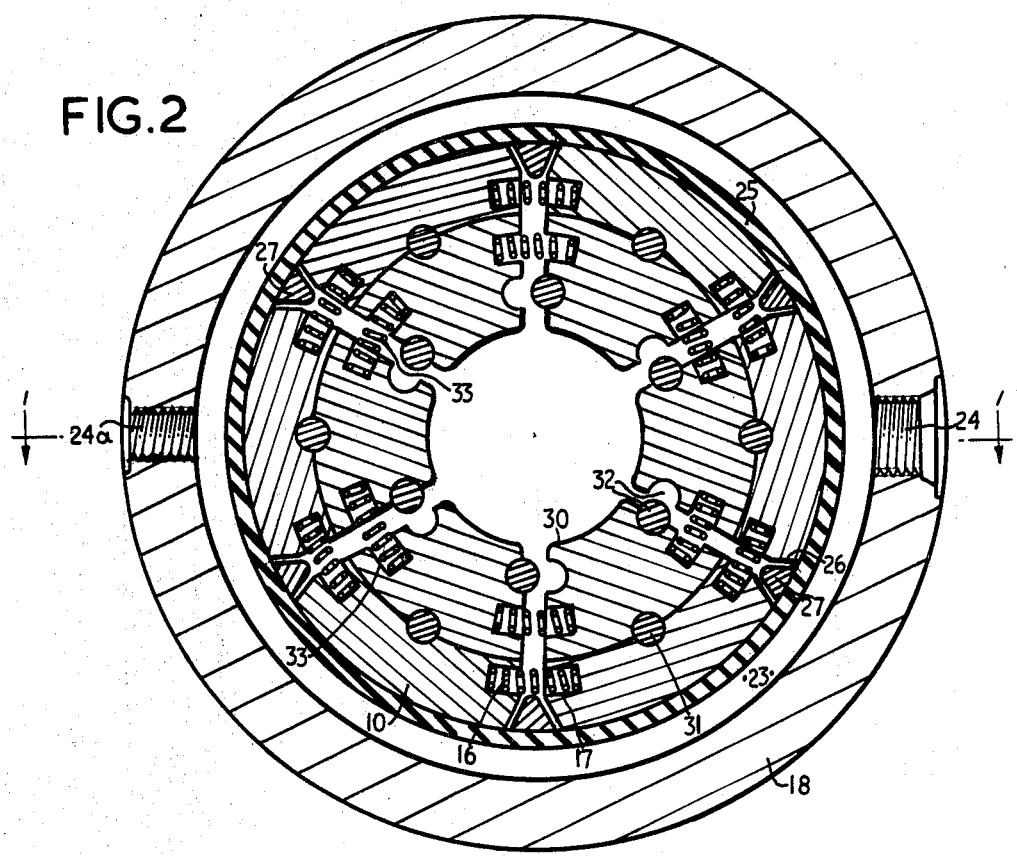
FIG. 2
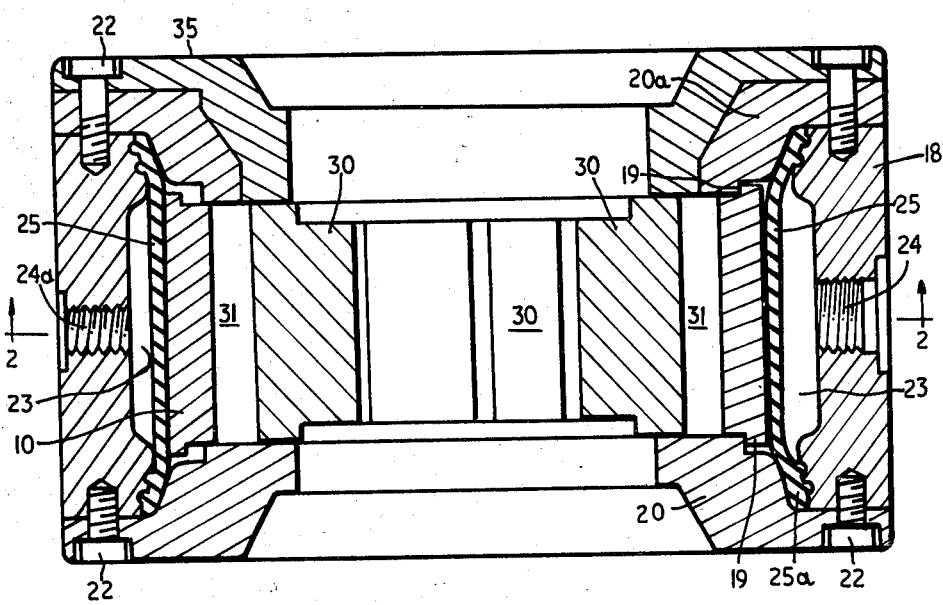
FIG. I
INVENTORS
FREDERICK RUSSELL DUFFIELD,
CLAUDE HARCOURT HARVEY
BY
Schroeder, Siegfried
& Ryan
ATTORNEYS

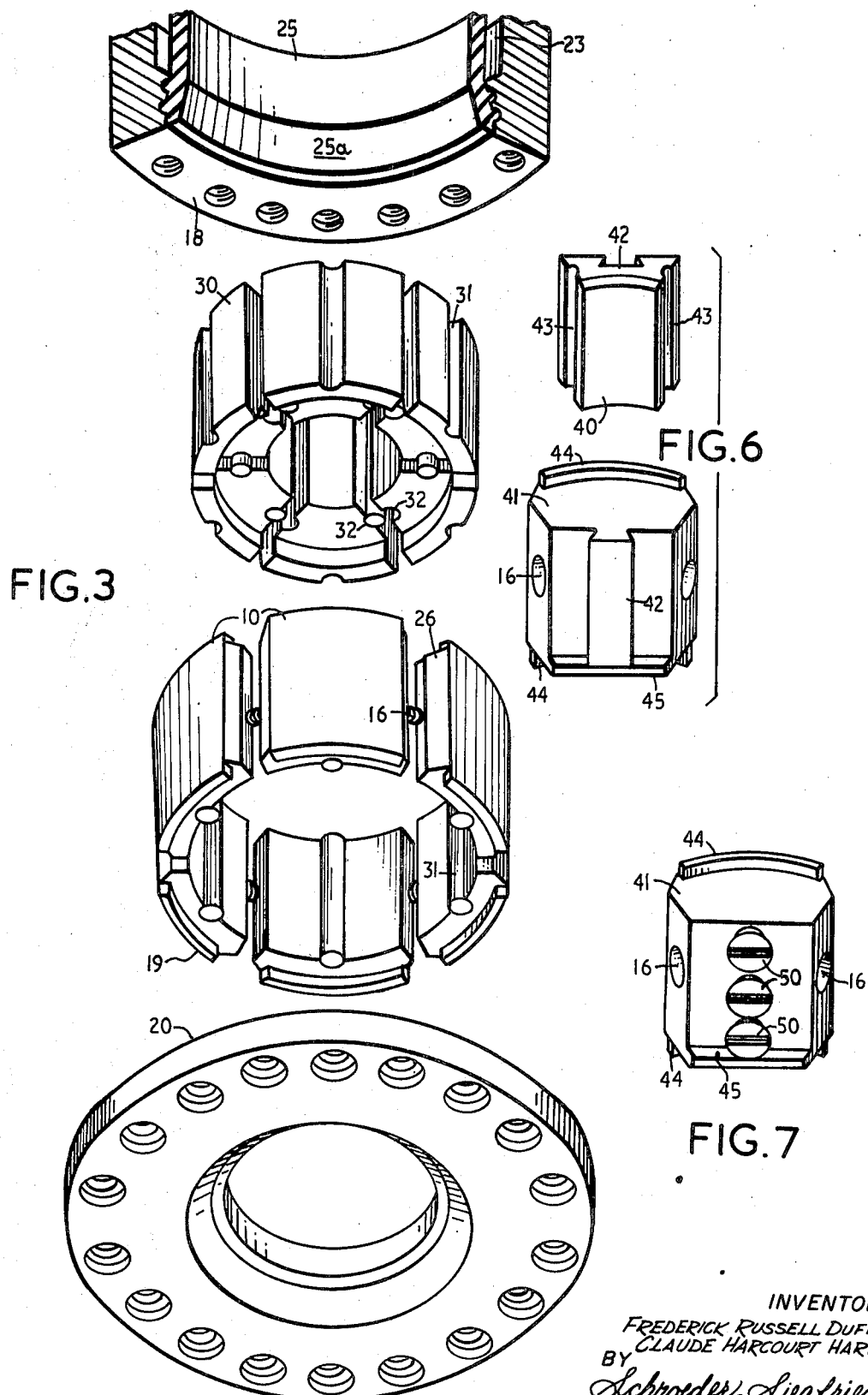

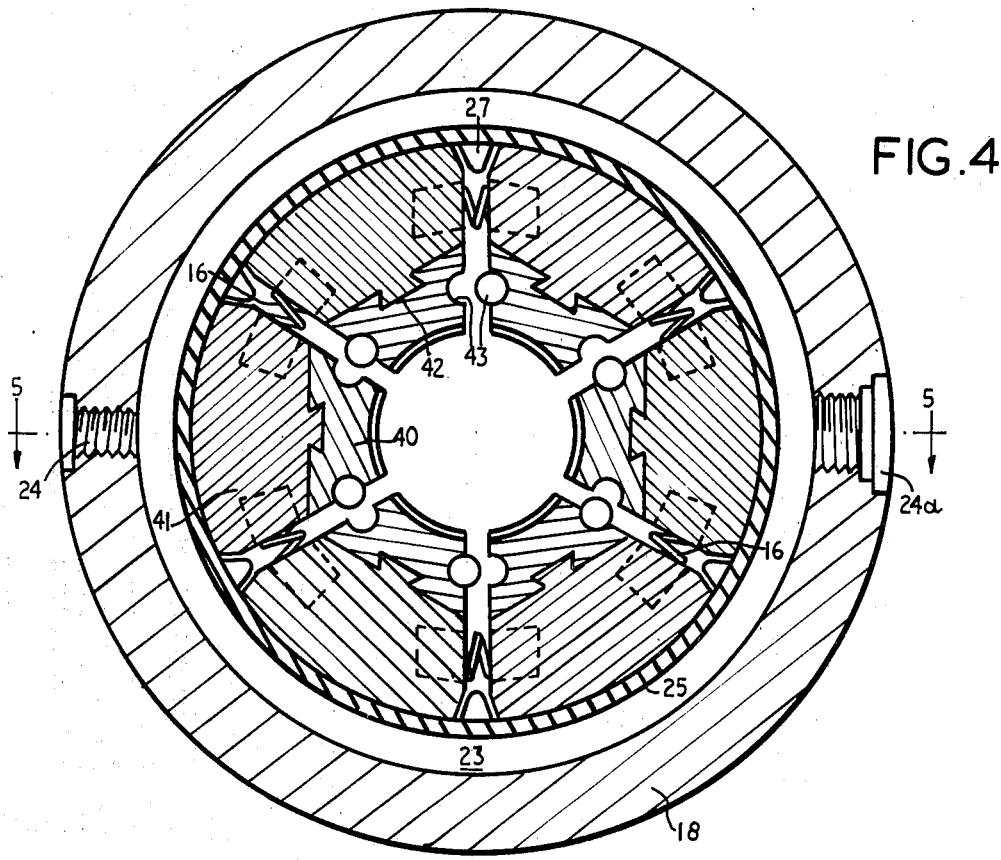
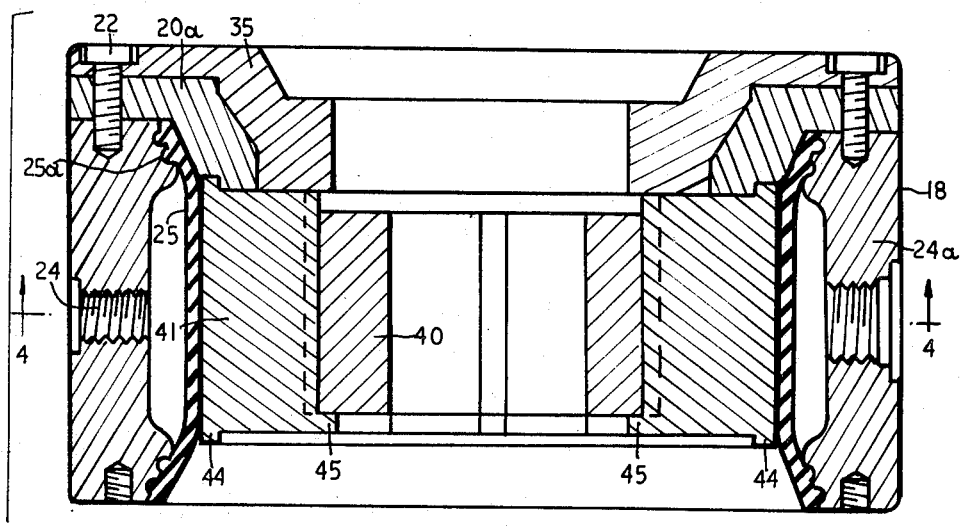
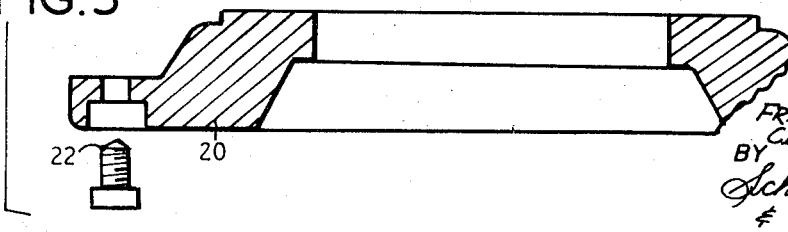

3,568,495
CRIMPING OR COMPRESSION DEVICE
Frederick Russell Duffield and Claude Harcourt Harvey, both of 355 Pacific Highway, Artarmon, New South Wales, Australia
Filed Feb. 12, 1969, Ser. No. 798,727
Claims priority, application Australia, Feb. 19, 1968, 33,826/68
Int. Cl. B21j 9/12
U.S. Cl. 72—402        13 Claims

ABSTRACT OF THE DISCLOSURE

A fluid operated crimping or swaging press which is adapted for exerting a radial pressure on an article, such as a hose end fitting, positioned in the centre of the press. The radial pressure is exerted through a series of primary collet members upon injection into the press of a pressurized fluid medium and, to permit interchangeability of the primary collet members—for various applications, the primary collet members are surrounded by and are removably fitted to captive secondary collet members.

---

This invention relates to an improved fluid operated crimping (or swaging) press or other compression device in which a substantial radial pressure is to be exerted upon some article in the centre of the device.

Examples are a crimping press for crimping hose fittings on to the ends of pressure hoses, or cables, various dies for use in moulding, chucks and clamps for use in machine tools, on work benches or as parts of climbing jacks.

Normally such devices (hereinafter called crimping tools for convenience of reference) if not of a small size and mechanical nature for manual operation, comprise a number of collet segments which can be forced towards each other by individual hydraulic rams all energized simultaneously or by surrounding thrust rings or linkages. Such constructions are of a rather complicated and expensive nature. Moreover often they cannot readily be adapted to different uses, for example to crimping the ends of hoses of varying diameters.

It is an object of the present invention to overcome the above disadvantages of prior art devices and to provide an improved construction for a fluid operated crimping tool which, while of a relatively economical and simple mode of construction (yet efficient in operation), shall be readily adaptable to different uses, as hereinafter explained.

There is provided in accordance with the present invention a fluid operated tool comprising a series of primary collet members arranged around a central space, a series of secondary collet members surrounding said primary collet members, and a flexible sleeve surrounding said secondary collet members, there being a space surrounding said sleeve into which a fluid medium may be introduced under pressure to act on said sleeve and thereby force both said secondary and primary collet members simultaneously inwards, the primary collet members aforesaid being detachable from the secondary ones and replaceable by other primary collet members without removing said secondary collet members or said sleeve from the tool.

Preferably there is a splined or equivalent sliding interconnection between the primary and secondary collet members.

The fluid medium may be hydraulic or pneumatic.

The primary collet members above referred to may take the form of simple segmented members having smooth arcuate inner faces, or be formed with profiled arcuate faces for performing specific clamping or crimping operations, or be shaped such that they together define an octagonal or other shaped aperture, or even carry shaped projections on their inner faces for performing specific functions such as, for example, punching radial holes in tubes or shearing rods or tubes. Thus the crimping (or clamping) device in accordance with the invention may be employed for such purposes as crimping or swaging tubular or profiled pipe or cable ends, thread moulding on the ends of pipes or guillotining or perforating tubes of various materials. The device may also be employed as a fluid operated clamp, vice or lathe chuck. And it may be readily adapted from one such use to another or from the treatment of one size of workpiece to another.

The invention will be more fully understood and further features made apparent from the following description of two constructional embodiments thereof taken in conjunction with the following drawings wherein:

FIG. 1 shows a sectional elevation view of a clamping or crimping device in accordance with one embodiment of the invention (the view being taken along plane 1—1 of FIG. 2) the right hand side thereof illustrating the movable elements in an actuated position and the left hand side showing the same elements in a normal (unloaded) position;

FIG. 2 shows a sectional view taken along the plane 2—2 of FIG. 1, the movable elements all being shown in the normal positions;

FIG. 3 is an exploded view of the clamping or crimping device illustrated in section by FIG. 1, a portion only of parts of the device being shown;

FIG. 4 is a sectional plan view through a clamping or crimping device in accordance with the second embodiment of the invention, the view being taken upon the line 4—4 of FIG. 5;

FIG. 5 is a sectional elevation through the device according to the second embodiment, on the line 5—5 of FIG. 4, part of the device being shown detached;

FIG. 6 is a detailed exploded view showing certain segments forming part of the second embodiment; and FIG. 7 is a view similar to part of FIG. 6 showing a modification of the segment 41 of FIG. 6.

In the embodiment of the invention illustrated by FIGS. 1 to 3 a crimping or clamping device (hereinafter referred to as a crimping tool for use in crimping hose end fittings onto the ends of high pressure hoses) comprises, inter alia, six secondary collet segments 10. These are machined from metal and are of tapering form with concentric inner and outer arcuate boundaries. When brought together they form an annulus.

The segments 10 are furnished with springs 16 in their meeting faces which serve to separate the segments from one another upon their moving radially outwards, the springs 16 being retained within cooperating pockets 17 in adjacent segments 10.

The segments 10 are retained within an annular cage or housing 18, lips 19 being provided on the segments 10 to engage shoulders on end rings 20, 20a of the casing to limit inward radial movement of the segments upon application of a clamping pressure, as hereinafter described.

The end rings 20, 20a are machined and are bolted to annular part 18 of the metal case by bolts 22 passing through them near their peripheries.

There is an annular space 23 between the outer arcuate boundary of the segments 10 and the cylindrical cage 18 and into this space high pressure fluid, either hydraulic or pneumatic fluid, may be introduced by a suitable connection 24. A second connection 24a is closed by a bleeder plug and this or a further connection may also carry a pressure relief valve, if thought necessary.

The space 23 is suitably sealed against escape of said fluid between the cylindrical cage wall and the end rings 20 by the end portions of a substantially cylindrical sleeve or diaphragm 25. This sleeve or diaphragm 25 may be reinforced or, in effect, comprise two laminated sleeves, if necessary.

The sleeve 25 is clamped between bevelled circularly grooved faces upon the cylindrical cage 18 and the end rings 20, 20a and may have its ends pre-set by moulding to give it a ridged bell mouth 25a (FIG. 3) at each end to fit between the grooved and bevelled surfaces and to dimension its diameter correctly. The sleeve 25 completes the fluid tight enclosure of the pressure space 23 and when fluid pressure is applied in this space and upon the outer face of the sleeve 25 the latter forces all the segments 10 radially inwards without there being any need for separate hydraulic pistons or like parts.

While the arrangement so far described may be suitable for use in certain circumstances, particularly if the sleeve 25 is of a fairly stiff nature, it will be found with most sleeves that the arrangement just described will result in the sleeve 25 being forced into the spaces between the segments 10 when these are relieved of pressure and moved radially outwards and apart from one another and then being nipped next time the segments 10 are forced together.

To prevent this happening it is desirable that the longitudinal edges of the segments 10 be bevelled as shown at 26. Preferably the spaces formed by bevelling of the edges of the segments 10 in this way are filled by elongated wedge members 27 of substantially triangular cross-section, although having somewhat rounded corners. These wedge members 27 substantially fill the spaces formed by the bevelled portions 26 of the segments 10.

To remove or interchange the segments 10 it is necessary to remove one or other of the end rings 20 or 20a thus causing breakage of the seal between the sleeve 25 and the cage 18.

Therefore, if the device is to be used for clamping or crimping end fittings on to various size hoses, or where the device is to perform any one of a number of independent operations (for example crimping, guillotining or perforating tubes) the segments 10 cannot conveniently be used directly to engage a central workpiece (not shown).

Accordingly the crimping tool of this invention comprises, inter alia, both primary and secondary collet segments.

The secondary collets 10 have already been described and each of these has associated with it a primary collet segment 30 which is narrower than the associated secondary collet segment.

There are dowel and groove interconnections as indicated at 31 between the primary and secondary collets to maintain these in alignment with one another. Such positioning interconnections are described in prior Australian patent application No. 44,825/64. The dowel pin is held in a groove extending around slightly more than a semi-circle and is spot-welded therein. The groove in the primary collet member is slightly less than a semicircle.

To maintain the various primary collet members 30 in radial alignment with one another similar dowel pin and groove inter-connections 32 are provided in the end faces of the primary collets 30.

There are also springs 33 set into the meeting faces of the primary collets 30 to separate the latter as the tool opens and to function in a similar manner to the springs 16 previously mentioned.

The radially inner faces of the primary collet segments 30 are suitably sized and shaped for performing the desired operation upon the centrally located workpiece (not shown).

The end rings 20 and 20a position the secondary collets 10 and at one end of the two there is a further, narrower annular end ring 35 held by screws 22 to the annular casing 18. This annular end ring 35 can be removed separately from the end rings 20 and 20a and enables access to be had to the primary collet members 30 and their replacement by other primary collet members to perform a different function without disturbing the secondary collet segments 10 or the diaphragm 25.

In the second embodiment of the invention illustrated in FIGS. 4 to 7 a different inter-connection between the primary and secondary collet members is provided. This is in some cases more readily adapted for the interchange of the primary collet segments without disturbing the secondary ones.

In this second construction the casing, diaphragm casing and end rings are all similar to those of the first construction, and are given the same reference characters, as are other elements which are common to the two embodiments.

However, the primary collet segment members 40 and the secondary collet segments 41, instead of the dowel pin and groove arrangement 31 now have a splined interconnection 42. Also there are now no separating springs such as 33 in the primary members, although the springs 16 between the secondary segment members 41 are still retained. There is still the groove and dowel pin interconnection between the primary collet segments as illustrated at 43.

Reference to FIG. 6 will show that the secondary collet segments 41 are furnished at each end with projecting shoulders 44 which engage shoulders on the end rings 20 and 20a and limit the inward radial movement of both lots of collet segments and that there is also an end shoulder 45 upon the secondary collet segments 41 which limits the longitudinal movement of the primary segments 40 relatively to the secondary segments 41.

Thus the primary collet segments 40 can easily be slid out of the tool when the central, narrower annular end ring 35 is removed and new (or other) primary collet segments will be correctly positioned both radially and longitudinally when they are slid into the tool until they contact the shoulders 45 on the secondary segments.

Thus adapting the tool to different sizes of workpiece or types of work is a simple operation readily performed in the field.

In FIG. 7 a modification of the splined interconnection between the primary and secondary collet segments is illustrated.

Instead of providing a machined spline machining costs are saved by providing a row of bevelled projections 50. These may comprise bevel head screws (or countersunk head screws, as shown in FIG. 7) or separate bevelled pieces of metal held by drive screws or in any other convenient manner to the inner face of the secondary collet segment 41, to form the male half of the dove tail.

The sleeve or diaphragm 25, is preferably moulded from polyurethane; the cage, end rings and segments being preferably cast or fabricated from high tensile steel.

Variations and modifications falling within the scope of the appendent claims may be made without departing from the spirit and scope of the invention hereinbefore described with reference to either of the embodiments shown in the drawings. For example, the sleeve or diaphragm 25, need not be cylindrical.

In some cases there may be, for example, four substantially triangular shaped segments which are surrounded by a rectangular sleeve inside a rectangular casing.

It is possible by utilising the present invention to get high swaging pressures in a completely portable unit which can be furnished with a carrying handle (not shown) if desired. The unit can be rested on the work bench, or in a simple stand, with its axis either horizontal or vertical, even if the swaging pressure is as high as 30 tons per square inch. The pressure is entirely self-contained and not exerted against any external abutment necessitating firm mounting of the device.

For high pressures the diaphragm may conveniently be produced from polyurethane reinforced with glass fibres.

Neoprene and other plastic diaphragms or even flexible metal diaphragms also can be employed.

While a high hydraulic pressure is often required this does not need to be exerted for a long time or through a long travel. Accordingly the pressure may be generated even out in the field from compressed air, lower pressure hydraulic fluid or even a manually operated power source acting for example upon a large area piston coupled to a small area piston to compress the hydraulic fluid.

It is also possible to generate high pressure fluid by firing a small explosive charge above a piston in a hydraulic cylinder, the charge being such as employed in powder power riveting tools.

Because the device of the invention does not require lubrication a further advantage thereof is that there is no risk of contaminating the hose fittings or other articles being swaged.

What is claimed is:

1. A fluid operated tool comprising an outer casing, a series of primary collet members arranged within said casing to define a central space, a series of secondary collet members surrounding said primary collet members and detachably secured thereto, a flexible sleeve surrounding said secondary collet members, and a space defined by said sleeve and said casing surrounding said sleeve, said space being adapted to receive a pressurised fluid medium arranged to act on said sleeve to thereby force both said secondary and primary collet members simultaneously inwards, said primary collet members being detachable from the secondary collet members without said secondary collet members or said sleeve being removed from the tool.

2. A tool as claimed in claim 1 wherein said outer casing comprises an annular cage fitted at each end with end rings, said end rings serving to restrain axial movement of said primary collet segments and said sleeve being clamped at each end between the respective end rings and the annular cage.

3. A tool as claimed in claim 2, there being end projections on said primary collet members, and a flange upon each of said end rings engageable by said end projection to centralize the inward movement of the collet members.

4. A tool as claimed in claim 1, wherein said secondary collet members are furnished with springs in their respective adjacent faces thereof, said springs being adapted to separate the collet members upon their moving radially outwards there being co-operating pockets in adjacent secondary collet members faces which receive and retain said springs.

5. A tool as claimed in claim 1 wherein said primary and secondary collet members are furnished, in mutually adjacent faces, with co-operating positioning grooves and dowels.

6. A tool as claimed in claim 1 wherein said secondary collet members are detachably secured to said primary collet members by a splined connection.

7. A tool as claimed in claim 6 wherein said splined connection comprises a dovetail shaped key and slot connection.

8. A tool as claimed in claim 1 wherein said secondary collet members are bevelled along outer longitudinal edges thereof, together with wedge elements positioned in spaces defined by adjacent bevelled edges of mutually adjacent secondary collet members and the sleeve.

9. A tool as claimed in claim 1 wherein said outer casing comprises an annular cage fitted at one end thereof with a first removable end ring arranged to restrain axial movement of both the primary and secondary collets toward said one end of the cage and, at the other end thereof, a second removable end ring arranged to restrain axial movement of the secondary collet members towards said other end, together with a further removable end ring arranged to restrain axial movement of the primary collets toward said other end of the cage, said sleeve being clamped at each end between the first and second end rings respectively and the annular cage.

10. A tool as claimed in claim 9, there being end projections on said secondary collet members and a flange upon said first and second end rings arranged to be engaged thereby to limit the maximum radial inward movement of both the secondary and primary collet members.

11. A tool as claimed in claim 1, said primary and secondary collet members being independently furnished with springs in respective adjacent faces thereof, said springs being adapted to separate the respective collet members upon their moving radially outwards, there being co-operating pockets in adjacent collet members' faces which receive and retain said springs.

12. A tool as claimed in claim 2 wherein the sleeve specified comprises an annular moulded plastic sleeve having profiled end portions adapted to form a gasket between the cage and the end rings.

13. A tool as claimed in claim 6 wherein said splined connection comprises a row of undercut projections secured to the inner face of each of the secondary collet segments and a dovetail shaped slot formed in the primary collet members.

References Cited

UNITED STATES PATENTS

| | | | |
|---|---|---|---|
| 973,035 | 10/1910 | Grenelle | 72—402 |
| 1,106,741 | 8/1914 | Slick | 72—402 |
| 2,256,740 | 9/1941 | Gup | 72—402 |
| 3,362,212 | 1/1968 | Steele | 72—402 |
| 3,451,249 | 6/1969 | Sharon | 72—402 |

CHARLES W. LANHAM, Primary Examiner

G. P. CROSBY, Assistant Examiner

U.S. Cl. X.R.

72—453